United States Patent [19]

Giles

[11] Patent Number: 4,676,473
[45] Date of Patent: Jun. 30, 1987

[54] COMPRESSOR MOUNTING BRACKET

[75] Inventor: William E. Giles, Garden Grove, Calif.

[73] Assignee: Truckers Comfort Systems, Inc., Tustin, Calif.

[21] Appl. No.: 740,289

[22] Filed: Jun. 3, 1985

[51] Int. Cl.$^4$ ............................................... F16F 7/00
[52] U.S. Cl. ................................... 248/638; 248/674; 248/680; 248/316.6
[58] Field of Search ............... 248/638, 672, 673, 674, 248/316.6, 637, 675, 680, 313, 316.1

[56] References Cited

U.S. PATENT DOCUMENTS

| | | | |
|---|---|---|---|
| 1,761,752 | 6/1930 | Scott | 248/316.6 |
| 2,701,928 | 2/1955 | Keenam | 248/316.6 |
| 2,910,262 | 10/1959 | Haessler | 248/638 |
| 3,339,868 | 9/1967 | Ehrens | 248/674 |
| 4,461,446 | 7/1984 | Hannibal | 248/638 |

*Primary Examiner*—Reinaldo P. Machado
*Assistant Examiner*—A. Chin-Shue
*Attorney, Agent, or Firm*—Knobbe, Martens, Olson & Bear

[57] ABSTRACT

A vibration suppressing mounting bracket for mounting the compressor of a vehicle air conditioner within a housing. The bracket is part of a mounting system for the compressor, the mounting system further comprising (1) a plurality of legs which are resilient mounts secured to the bottom of the compressor and to the housing, and (2) a pin extending from the top of the compressor which passes through a hole in a mounting plate, the plate also being secured to the housing. The bracket is formed from two arcuate segments which, when fastened together, form a substantially ring-shaped bracket which surrounds the cylindrical exterior of the compressor. The radially inner surface of the bracket is covered with a foam shock absorbing pad which is in contact with the compressor's exterior. The bracket is also bolted to the walls of the housing.

9 Claims, 3 Drawing Figures

U.S. Patent    Jun. 30, 1987    4,676,473
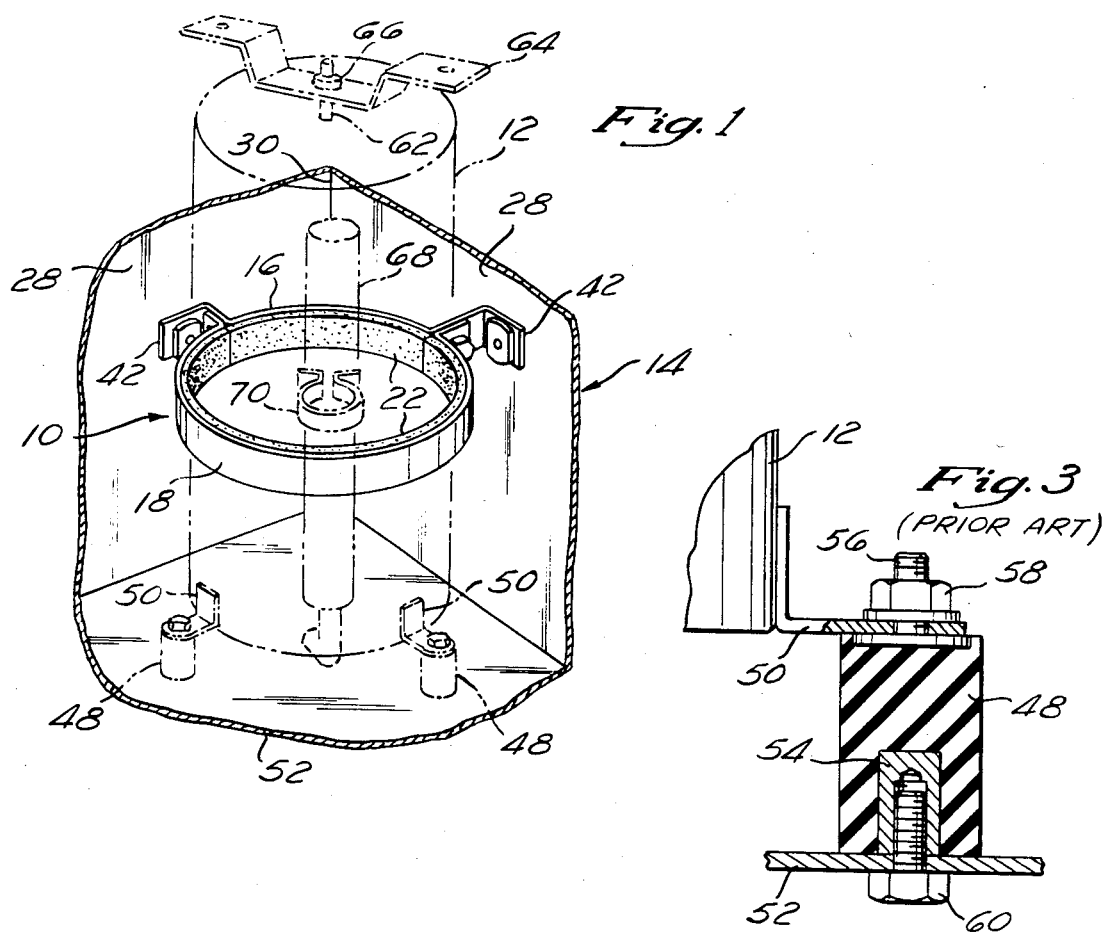
Fig. 1
Fig. 3 (PRIOR ART)
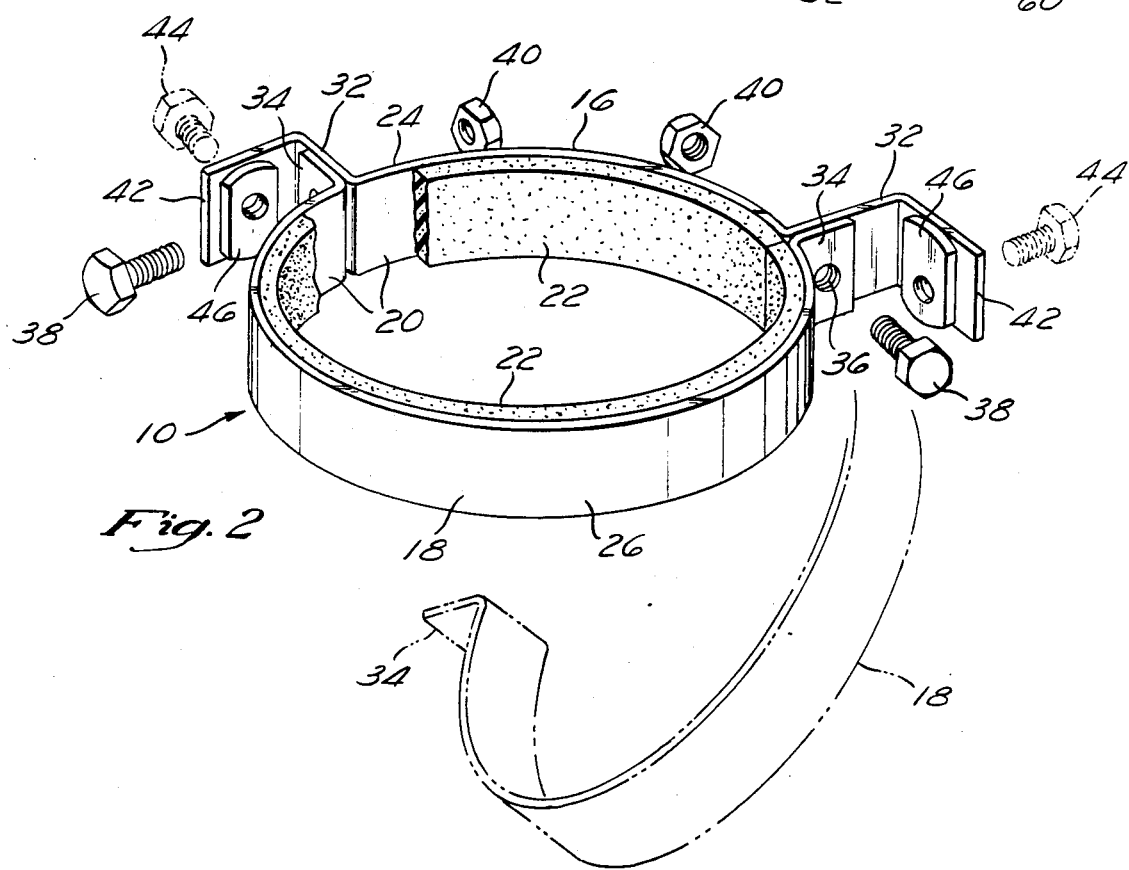
Fig. 2

COMPRESSOR MOUNTING BRACKET

BACKGROUND OF THE INVENTION

This invention relates generally to a vibration suppressing mounting apparatus, and more particularly to a mounting apparatus which is used to mount a vehicle air conditioning compressor within a housing.

Often, large motor vehicles have air conditioning units with compressors that are electrically powered, as opposed to being directly driven by the vehicle's engine. Previously, difficulty has been encountered in providing long lasting vibration isolating mounts for electrically powered vehicle air conditioning compressors.

In particular, air conditioning compressors in tractor trailer trucks, RVs, and motor homes encounter large amounts of vibration in addition to that caused by the operation of the compressor itself. Sources of this additional vibration include the vehicle's engine, and road surface contact. Damage to the mounts results in either costly and time-consuming repairs, or the discomfort of foregoing the use of air conditioning.

Generally, previous compressor mounting systems have consisted of three legs extending from the bottom of an axially vertical, cylindrical compressor. The legs are cylindrical elastomeric mounts which at one end are bolted to flanges on the bottom of the housing in which the compressor is mounted, and at the other end are bolted to the bottom of the compressor. A nut is suspended within the mount at one end, and a bolt is bonded to the other end, and extends axially outward. The nut and bolt are connected only by the elastomer which form the mount. Thus, the legs do not provide a rigid mount, but in effect are vibration absorbing elastomeric links between the compressor and housing.

Additionally, some previous mounting systems have had another mount at the top of the compressor. The top mount consists of a pin extending axially upward from the exterior of the compressor, and which passes through a hole in a mounting plate secured to the top of the housing. The pin is not rigidly secured to the mounting plate, however, there is little clearance for the pin within the hole, so the pin limits motion of the compressor.

These previous mounting systems have proven unsatisfactory in use due to their propensity for vibration related failures. In particular, the elastomeric mounts which form the legs will tear apart after a relatively short period of use, rendering the compressor inoperative. Since the flanges for the legs and the pin are usually integral with the compressor, it is desirable to still utilize those mounts so that the compressor itself will not have to be redesigned.

Thus, a need exists for a dependable vehicle air conditioning compressor mount which can be used in combination with existing mounting systems and which will sufficiently suppress vibration to extend the useful life of previously used mounts.

SUMMARY OF THE INVENTION

Briefly stated, the present invention consists of a vibration suppressing bracket for use in mounting a vehicle air conditioning compressor within a housing. The bracket consists of two substantially arcuate segments which are fastened together to form an annular bracket. The bracket is segmented to facilitate its installation and fabrication. The bracket segments are preferably formed from thin, rigid, metallic strips. The radially interior surface of the bracket is covered with a resilient, shock-absorbing foam padding, preferably neoprene.

The segments are fastened together by bolts which pass through segment fastening flanges on the ends of each segment. When the bracket segments are fastened together around the cylindrical exterior of the compressor, the padding contacts the exterior of the compressor. Radially directed vibratory motion of the compressor relative to the bracket will squeeze the foam padding between the compressor and the bracket, thus damping the vibration.

The bracket is fastened to two walls of the housing by means of housing fastening flanges which extend from the ends of the segment fastening flanges. Preferably, the included angle of one of the arcuate bracket segments is equal to the angle between the walls of the housing to which the bracket is fastened.

The bracket is preferably used as part of a compressor mounting system, which includes, in addition to the bracket, legs which are comprised of cylindrical elastomeric mounts fastened to the bottom of the compressor and to the housing. Also, the mounting system includes and a pin protruding axially from the top of the compressor which is inserted through a hole in a mounting plate, the mounting plate being fastened to the top of the housing. In testing, the useful life of the legs has been extended significantly by the use of the compressor mounting bracket.

BRIEF DESCRIPTION OF THE DRAWINGS

FIG. 1 is a perspective view of the present mounting bracket as used to mount a prior art compressor which is shown in broken lines; also shown in broken lines is a prior art mounting bracket at the top of the compressor, and prior art legs secured to the bottom of the compressor.

FIG. 2 is a perspective view of the two segments of the present mounting bracket with the associated fasteners for the bracket shown as exploded.

FIG. 3 is a cross-sectional view of a compressor leg taken along line 3—3.

DETAILED DESCRIPTION OF THE PREFERRED EMBODIMENT

FIG. 1 shows a preferred embodiment of a novel vibration damping mounting bracket 10 as used for mounting a vehicle air conditioning compressor 12 (shown in broken lines) within a housing 14. The bracket 10 may also be utilized to provide a vibration damping mount for other types of vibrating units.

FIG. 2 shows the mounting bracket 10 in greater detail. The bracket 10 consists of two segments, a short segment 16 and a long segment 18. The segments 16 and 18 each have a radially interior surface 20, which substantially conforms to the exterior of the unit which is being mounted to the housing 14 by the bracket 10. A strip of resilient vibration absorbing padding 22 is secured to the interior surface 20 of the segments 16 and 18. The bracket segments 16 and 18 and the padding 22 are sized so that when the bracket 10 is in place surrounding the compressor 12, the padding 22 will snugly contact the exterior of the compressor 12.

In the illustrated embodiment, the segments 16 and 18 are shaped with arcuate portions 24 and 26, respectively. The arcuate portion 24 of the short bracket segment 16 has an included angle of approximately 90°. The arcuate portion 26 of the long bracket segment 18 has an included angle of approximately 270°, so that when assembled, an enclosed, circular ring is formed by the two segments 16 and 18, which conforms to the cylindrical compressor 12. The 90° angle of the short segment 16 corresponds with the angle between a pair of walls 28 on which the bracket is mounted. The walls 28 form a corner 30 within the housing 14.

To adapt the bracket 10 for use with walls that are not oriented at a 90° angle, a bracket can be formed with a short segment 16 having its arcuate portion 24 with an included angle which corresponds to whatever angle exists between the walls. Accordingly, the long segment 18 will be formed with an arcuate portion 26 that has an included angle such that the arcuate portions of the two segments will together form an enclosed, 360° circle. Similar variations in the size and shape of the segments 16 and 18 are within the scope of the invention, regardless of the exterior shape of the compressor 12, or the angular orientation of the walls 28, as long as the segments, once fastened together, surround the exterior of the compressor 12 with the padding 22 in contact with the compressor 12. Likewise, the bracket 10 can be adapted to be mounted to a single wall.

At each end of the short segment arcuate portion 24 are segment fastening flanges 32, which protrude radially outward and normal to the arcuate portion 24. A pair of mating segment fastening flanges 34 are similarly located on the ends of the long bracket segment arcuate portion 26. There are holes 36 through each of the segment fastening flanges 32 and 34. The holes 36 are aligned when the segments are oriented as in FIG. 2.

To fasten the segments 16 and 18 together, a bolt 38 is passed through each of the aligned holes 36 in each pair of segment fastening flanges, and nuts 40 are threaded onto the bolts 38. Other suitable fastening means may be substituted for the nuts 40 and bolts 38.

The bracket 10 is fastened to the walls 28 of the housing 14 by means of housing fastening flanges 42 which protrude normally from the ends of the segment fastening flanges 32 of the short bracket segment 16. One or both of the housing fastening flanges 42 can, alternatively, be located on the segment fastening flanges 34 of the long segment 18.

The housing fastening flanges 42 are secured to the housing walls 28 by means of bolts 44 (shown in broken lines) on the exterior of the housing which pass through holes (not shown) in the housing 14. The bolts 44 are threaded into nuts 46, which are preferably welded in place on the housing fastening flanges 42. Again, other suitable fasteners may be substituted for the nuts 46 and bolts 44.

The bracket 10 shown in FIG. 1 is part of a mounting system for the compressor 12 which further comprises a plurality of legs 48 secured to compressor flanges 50 extended from the bottom of the compressor 12. Preferably, the legs 48 are fastened to the flanges 50 at one end and to a floor 52 of the housing 14 at the other end. As shown in FIG. 3, the legs 48 preferably consist of cylindrical mounts fabricated from a resilient shock absorbing material, such as an elastomer. Suspended independently within the legs 48 are a tubular nut 54 and flatheaded bolt 56. The leg 48 is fastened to the flange 50 with a nut 58, and a bolt 60 passing through the housing floor 52 is fastened to the tubular nut 54 to secure the leg 48 to the housing. Thus, a flexible joint is provided between the compressor 12 and the housing floor 52.

Deformation of the elastomeric legs 48 permits motion of the compressor 12 in all directions. As the legs 48 are deformed, the vibration of the compressor 12 is damped.

A pin 62 protrudes axially upward from the top of the compressor 12 and passes through a hole in a mounting plate 64. Surrounding the pin 62 is a bushing 66 which eliminates clearance between the pin 62 and the mounting plate 64. The mounting plate 64 is secured to the top of the housing (not shown). The mounting plate 64 restricts motion of the pin 62 and therefore limits motion of the compressor 12 in the radial direction.

The flanges 50, legs 48 and pin 52 are standard items provided by compressor manufacturers.

To install the compressor 12 within the housing 14, the legs 48 are first bolted to the housing floor 52. The compressor 12 is then rested on top of the legs 48, with the flat-head bolts 56 protruding through the compressor flanges 50.

Next, the bracket 10 is installed around the compressor 12. The ends of the long bracket segment 18 are resiliently spread apart and the long bracket segment 18 is slipped around the compressor 12 and slid behind a suction tube 68. The long bracket segment 18 is then bolted to the short bracket segment 16 through segment fastening flanges 32 and 34. The assembled bracket 10 is then secured to the housing 14 by means of nuts 42 and bolts 44. Finally, the legs 48 are bolted to the compressor flanges 50, and the pin 62 is inserted within the mounting plate 64.

Installation of the bracket 10 on standard compressors is facilitated by its two segment construction. If the bracket were formed from a single, uninterrupted strip of material, or from a strip that was split at only one place, the bracket would have to be slid over from the top of the compressor to be installed. However, a clamp 70 is welded to the compressor 12 by the compressor manufacturer to secure the suction tube 68 in place, and thus the bracket 10 cannot be slid down from the top of the compressor 12. Additionally, sliding the bracket along the compressor exterior is difficult since there is a large amount of friction between the padding 22 and the compressor due to the snug fit of the padding 22.

Another advantage of the two segment construction of the bracket is that the segment fastening flanges 32, 34 and housing fastening flanges 42 of the bracket can be formed from the same strip of material that forms the arcuate portions 24, 26 of the bracket segments 16, 18, thus eliminating the need for additional fasteners or the use of welding to secure the flanges in place on the segments.

In operation, any vibratory motion of the compressor 12 in a radial direction results in a deformation or squeezing of the padding 22. The padding 22 behaves as a viscous damper and absorbs the energy of the vibrating compressor. Also, due to friction between the padding 22 and the compressor 12, axial motion of the compressor 12 is also limited.

The damping provided by the bracket 10 has been shown to extend the life of the other compressor mounts in testing conducted by Wyle Laboratories. Transportation vibration tests were conducted in accordance with MIL-STD-810C, FIG. 514.2-7, Curve AW, which consisted of sinusoidal cycling over a frequency range of 5 to 200 hertz along three mutually orthogonal axes, with a peak acceleration of 1.5 G's.

The first test specimen comprised an air conditioner with a compressor mounted only by a set of legs 48, and a pin 62 and a mounting plate 64. After approximately 49 minutes of cycling along an axis radial to the compressor, one of the legs 48 and a refrigerant line (not shown) leading to the compressor broke due to the excessive vibratory motion of the compressor. Although the pin 62 limits radial motion at the top of the compressor, the legs 48 allow radial motion at the bottom of the compressor, and it is this motion which caused the failure.

The broken items were replaced, and the bracket 10 was installed to form the second test specimen, having a mounting system as shown in FIG. 1. As a result of the vibration damping provided by the bracket 10, the entire compressor mounting system withstood a total of over 200 minutes of cycling between independent tests along each of the three axes, with no damage to any compressor mounts or other structures within the air conditioner.

In a preferred embodiment, the bracket 10 is formed from thin strips of steel, measuring 1" wide in the axial direction, and 1/16" thick, in the radial direction. The preferred material for the padding 22 is a 1"×¼" neoprene pad.

What is claimed is:

1. A vehicle air conditioner compressor mounting bracket for mounting a compressor within an air conditioner housing, the compressor including a vacuum tube spaced from the exterior of the compressor and extending substantially parallel thereto, wherein said bracket (i) damps the vibration of the compressor to prevent the failure of any other compressor mounts, (ii) can be utilized with existing compressors, and (iii) can be easily installed and removed, said bracket comprising:

a first bracket segment, comprised of a thin metallic strip which has an arcuate portion having an included angle of approximately 90°;

a second bracket segment, comprised of a thin unitary metallic strip which has an arcuate portion with an included angle of approximately 270°, so that when the ends of the second bracket segment are fastened to the ends of the first bracket segment, said segments together form an annular bracket;

a resilient padding covering the radially interior surface of the bracket segments, said bracket segments being sized and shaped so that when the segments are fastened together around the sides of a compressor having a substantially cylindrical exterior configuration, the resilient padding of the bracket contacts the exterior of the compressor, said padding becoming deformed upon the vibration of the compressor so as to damp said vibration;

two segment fastening flanges on each of the two said bracket segments, said segment fastening flanges protruding normal to the arcuate portions of said bracket segments and radially outward from the bracket segments, one flange being at each end of said segments, the flanges of one segment having holes which mate with holes the flanges of the other segment, so that the flanges can be bolted together to removably fasten the segments to one another, said segment fastening flanges and said second bracket segment being sized to permit said second bracket segment to be slid between the compressor exterior and the vacuum tube so as to facilitate installation of said bracket; and two housing fastening flanges on said first bracket segment, one housing fastening flange protruding normally from each of the segment fastening flanges of the first bracket segment, said housing fastening flanges having holes therein so that said first bracket segment may be removably bolted to two walls of the housing, said walls disposed relative to each other at a 90° angle.

2. The bracket of claim 1, wherein said bracket segments are comprised of steel strips, and said resilient padding is comprised of a strip of neoprene.

3. The bracket of claim 2, wherein said steel strips have a width of approximately 1 inch in the axial direction, and a depth of approximately 1/16 inch in the radial direction.

4. The bracket of claim 1, wherein said housing fastening flanges have nuts welded thereon so that the first bracket segment may be bolted to the housing.

5. The bracket of claim 1, wherein the bracket is utilized in a compressor mounting system in which the bracket surrounds the sides of the compressor and the bracket is fastened to the side walls of the housing, said mounting system further comprising a plurality of legs protruding from the bottom of the compressor and fastened to the bottom of the housing.

6. The mounting systems of claim 5 wherein said legs comprise cylindrical vibration absorbing mounts which are fastened at one end to the bottom of the compressor and at the other end to the housing, providing a resilient coupling between the housing and compressor.

7. The mounting system of claim 5, further comprising an elongated pin protruding from the top of the compressor, said pin passing through a hole in a mounting plate, said mounting plate being secured to the top of the housing.

8. The bracket of claim 1 wherein said pad is sized to snugly engage the exterior of the compressor without being substantially deformed while the compressor is stationary.

9. The bracket of claim 8 wherein said compressor has a vertically oriented longitudinal axis, said bracket adapted to surround said compressor in a plane which is substantially normal to said compressor longitudinal axis.

* * * * *